Patented Mar. 16, 1954

2,672,408

UNITED STATES PATENT OFFICE 2,672,408

FUEL OIL COMPOSITION

William A. Bonner, East Alton, Ill., assignor to Shell Development Company, Emeryville, Calif., a corporation of Delaware No Drawing. Application November 28, 1950, Serial No. 198,025

20 Claims. (Cl. 44—72)

This invention relates to improvements in means for the protection of particular blends of liquid hydrocarbons against discoloration, and, more particularly, stabilizing certain compounded liquid petroleum hydrocarbon blends which have been rendered non-clogging, which blends of liquid hydrocarbons are particularly suitable as industrial and domestic fuels.

It is well known in the art that liquid hydrocarbon fractions, particularly those which have been subjected to cracking, whether thermal or catalytic, possess a tendency to discolor on standing, and also develop foreign bodies which cause gum formation and clogging of equipment in which they are employed. Straight-run liquid hydrocarbon fractions, however, are substantially resistant toward discoloration, whereas cracked fractions are highly susceptible toward discoloration.

A surprising observation has been made with mixtures or blends of straight-run and cracked (thermal or catalytic) hydrocarbon distillates having a boiling point range of from about 340° F. to about 700° F., and preferably a boiling range of from about 400° F. to about 675° F., in that they are more unstable toward discoloration than cracked stocks. Discoloration of mixtures or blends of straight-run with cracked hydrocarbon stocks is particularly pronounced when the cracked fraction is the minor constituent of the hydrocarbon blend.

Although it is difficult to account for the more pronounced tendencies of blends of straight-run and cracked hydrocarbon stocks to discolor than the highly unstable cracked stocks per se, it is believed that the nature of the asphaltene particles, or of their precursors, such as resins present or formed in blends under discussion, particularly when in contact with water droplets, not only causes much more rapid color deterioration than would normally take place in cracked stocks (which is contrary to the results one would surmise in view of the fact that straight-run stocks are resistant to discoloration), but the clogging tendencies of such blends are also accentuated.

It is an object of this invention to inhibit discoloration of mixtures or blends of straight-run and cracked hydrocarbon distillate stocks. Another object of this invention is to prevent discoloration of mixtures or blends of straight-run fuel oils with cracked fuel oils. Still another object of this invention is to prevent discoloration of mixtures or blends of straight-run and cracked fuel oils which have a tendency to cause clogging. It is also an object of this invention to prevent discoloration of mixtures or blends of straight-run and cracked fuel oils compounded with anti-clogging agent(s). Still another object of this invention is to provide color stable blends of straight-run and cracked fuel oil compositions which are color stable, non-corrosive and which are effective for cleaning and for removing sludge from systems.

The above and other objects of this invention can be obtained by dispersing or dissolving in a blend of hydrocarbon distillate or residual fuel oils, said blend comprising straight-run and cracked fuel oil in which the straight-run fuel oil component of said blend must be present in at least 20% (preferred 60%) and blends comprising from 10% to 80% (preferred 10% to 40%) cracked fuel oil and from 90% to 20% (preferred 90% to 60%) of straight-run fuel oil to which blend is added an oil-soluble water-insoluble amine of which the tertiary amine or mixture thereof are preferred.

The hydrocarbon fuel oils, of which the distillate fractions are preferred, although residual fuel oil blends can be used, with which this invention is particularly concerned, are fuel oil fractions above the gasoline boiling point range and include such oils as gas oil, fuel oil, furnace oils, burner oils, diesel fuel oils, kerosene and the like.

The cracked fractions which constitute one component of the fuel oil blend can be obtained by thermal or catalytic cracking, and may if desired, be acid and/or caustic treated. Also if desired, the straight-run fractions may be treated in a similar manner.

At this point, it is also desired to make quite clear that the present invention is not directed to the color stabilization of such hydrocarbon distillate fractions as cracked gasolines, which are generally known as being notoriously color unstable. Rather, as pointed out above, the present invention is singularly directed toward color stabilization of blends or mixtures, which mixtures must be present in critical proportions of treated and/or untreated straight run and cracked heavier fuel oils such as gas oil, furnace oils, diesel oils, burner oils and the like. Just as cracked gasolines are preferable to straight-run gasolines because of their higher knock rating, so are blends of fuel oils of the type with which the present invention is concerned, preferred to either straight-run or cracked fuels because of the better burning properties, wider applicability and use to which such blends can be put.

The general properties of fuel oils are:

| | |
|---|---|
| Gr., ° API | 29–37. |
| ASTM dist. (° F.): | |
| IBP | 320–450. |
| EBP | 520–700. |
| Pour point, ° F | —5 to 15. |
| Sulfur, per cent wt. | 0.1 to 1.0. |
| Carbon residue (10% btms.), per cent wt. | From less than 0.01 to 0.4. |

Specific examples of the properties of straight-run gas oil, catalytically cracked gas oil and two blends of 60-40 and 75-25 straight run catalytically cracked gas oils, blends are given in the table below:

| Properties | Straight-run gas oil | Catalytically cracked gas oil | 60% straight run 40% catalytically cracked gas oil | 75% straight run 25% catalytically cracked gas oil |
|---|---|---|---|---|
| Gravity, ° API | 35.7 | 36.7 | 34.5 | 35.3 |
| ASTM Dist. (° F.): | | | | |
| IBP | 402 | 324 | 370 | 372 |
| EBP | 670 | 534 | 638 | 660 |
| Flash Point, ° F | 196 | 136 | 170 | 178 |
| SUS at 100° F | 38.5 | 30 | 36.5 | 34.8 |
| Pour Point, ° F | .5 | .5 | —5 | |

The color stabilizers of blended fuel oils of this invention are oil-soluble water-insoluble amines, the general formula of which can be represented as follows: N(R)₃, wherein R can be hydrogen or the same or different hydrocarbyl radicals such as alkyl, aralkyl, alkaryl, cycloalkyl, alkenyl and the like, at least one R being a non-aromatic hydrocarbon radical, the tertiary amines are preferred, e. g.: triethylamine, tri-n-propylamine, tri-isopropylamine, tri-n-butylamine, tri-isobutylamine, tri-n-amylamine, trioctylamine, tridecylamine, diethyl benzylamine, di-n-butyl benzylamine, triallylamine, diallyl butylamine, dipropyl butylamine, diethyl cyclohexyl amine, dibutyl cyclohexylamine, dibutyl phenylamine, and mixtures thereof. Preferred are the oil-soluble tertiary straight chain alkyl amines, each of the alkyl radicals having at least four carbon atoms such as tri-n-butylamine, tri-n-amylamine, dibutyl octylamine, trioctyl amine and the like. Other oil-soluble, water-insoluble amines which can be used include the mono and di butyl, amyl, octyl, decyl, lauryl, oleyl and stearyl amines; mono and dicyclohexylamine, phenyl butyl amine and the like.

The above oil-soluble tertiary amines are effective as color stabilizers in blended fuel oil compositions of this invention when used in amounts of from 0.001% to 1% and preferably from 0.003% to 0.06%.

An important embodiment of the present invention is not only to color stabilize neat blends of fuel oil of this invention, but blends of said fuel oils which have been inhibited with agent(s) capable of preventing or inhibiting clogging of systems with which such blends are in contact.

Clogging of systems by fuel oils generally is caused by the presence in the fuel oil (which includes diesel fuel oil) of dispersed moisture and asphaltene particles or resinous materials capable of forming asphaltenes which are not entirely removed by refining methods. Other foreign materials, such as rust, dust and the like can aggravate the condition. Asphaltenes, and their precursors such as resins, are generally coated with heavy aromatics resulting in colloidal micelles that are rendered lyophilic. These asphaltene micelles, when in contact with water droplets, arrange themselves around water droplets and result in coagulation of particles which form a fibrous structure on contacting surfaces such as screens, causing clogging. Extraneous materials such as mentioned above, if also present in the fuel, are trapped mechanically by the screen and aggravate the situation.

Agents which can be used successfully in combating the clogging tendencies of fuels particularly blended fuels with which the present invention is concerned can be any agent or agents known in the art which possesses the property of functioning as an anti-clogging agent for fuel compositions. Additive(s) which can be used as anti-clogging agents for color stabilized blended fuel oil compositions of this invention include those disclosed in U. S. Patents 2,301,795; 2,369,490; 2,422,566 and 2,431,792, as well as anti-clogging additive or additives or concentrates of said additives with or without the auxiliary additives such as disclosed in U. S. patent applications: Ser. No. 31,596, filed June 7, 1948, now Pat. No. 2,524,864; Ser. Nos. 37,084, now Pat. No. 2,579,890, 37,095 now abandoned and 37,086, now Pat. No. 2,575,003, filed July 3, 1948; Ser. No. 37,306, now Pat. No. 2,548,347, filed July 6, 1948; Ser. No. 49,848, now Pat. No. 2,626,207, filed September 17, 1948; Ser. No. 17,804, now Pat. No. 2,527,987, filed March 29, 1949.

The preferred anti-clogging agents are oil-soluble petroleum sulfonates having a molecular weight above 430, and preferably in the range of from 450 to 650, of which the normal, basic and/or inner metal salts of group I, and II, as well as the metal salts of Zn, Al, Cu, Fe, Cd and Ni, as well as mixtures thereof are preferred.

In combination with the anti-clogging agents under certain severe conditions, auxiliary additives can be used, such as metallic aromatic acidic compounds e. g., metal phenates, metal phenol sulfides, metal salts of phenolaldehyde condensation products and the like. Specific compounds are: barium tertiary octyl phenol sulfide and disulfide, barium di-tertiaryamyl phenol sulfide, calcium isohexadecyl phenol sulfide, magnesium tertiary phenol sulfide, cobalt tertiary amyl phenol sulfide, barium dodecyl salicylate sulfide, sulfide of the barium salt of ethyl ester of p-hydroxydithiobenzoic acid, calcium octyl phenol selenide, calcium cetyl phenate, calcium dibutyl phenates, the zinc, magnesium, calcium, cobalt, strontium, barium, cadmium, nickel and iron salts of condensation products of octyl phenol and formaldehyde; aluminum salt of condensation product of dibutyl phenol and formaldehyde; the magnesium and aluminum salts of condensation products of octyl phenol and acetaldehyde; the zinc, magnesium, calcium, cobalt, aluminum, strontium, barium, cadmium, nickel and iron octyl or cetyl thiophenolate; the aluminum octyl or cetyl selenophenolate; the zinc, magnesium, calcium, cobalt, aluminum, strontium, barium, cadmium, and nickel octyl or cetyl phenol sulfide or thiophenolate sulfide; the zinc, magnesium, calcium, cobalt, aluminum, strontium, barium, cadmium, nickel, and iron octyl or cetyl phenolate; the zinc, magnesium, calcium, cobalt, aluminum, strontium, barium, cadmium, nickel and iron salts of diisopropyl salicylic acid; the zinc salt of octyl salicylic acid; magnesium salt of C₁₄-C₁₈ salicylic acid; the calcium, cobalt, aluminum, magnesium, strontium, barium, cadmium and nickel salts of $C_8$–$C_{18}$ salicylic acid; the zinc, calcium, cobalt, aluminum, magnesium, strontium, barium, cadmium, nickel and iron salts of cyclohexyl salicylic acid; and the zinc, magnesium, calcium, cobalt, aluminum, strontium, barium, cadmium, nickel and iron salts of alkyl benzoic acid.

For use in systems wherein substantial amounts of moisture is present, a drying agent may be added which is compatible with the active ingredients of this invention. By tying up a substantial portion of the free moisture in this manner, the amount thereof which would be available to contribute to sludge-formation is diminished, thus reducing somewhat the requirements for the essential anti-clogging agents.

Drying agents which are particularly suitable are the glycol ethers, which are specifically disclosed in the patent applications referred to in column 4.

In cases where blended fuel oils of this invention contain the anti-clogging agents as described above, it is preferred to make a concentrate first, and thereafter blending said concentrate or base into a blended fuel oil of this invention. The tertiary amine color stabilizer can be incorporated into the concentrate or into the final composition.

The following is a general formula of an anti-clogging base (concentrate) composition of this invention, the percentages being by weight:

| Primary Anti-Clogging Additive | General Range | Preferred Range |
|---|---|---|
| Metal oil-soluble organic sulfo and/or sulfate, e. g. oil-soluble Na or Ca petroleum sulfonates of high molecular weight (450–920). | 2–30% | 5–20%. |
| Auxiliary Additive: Salts of aromatic acidic compounds containing —(ZM)ₙ radical wherein Z is O or S, M is a cation and n is small integer of at least 1, e. g. Ca salt of oil-soluble condensation product of p-octyl phenol-formaldehyde or Ba salt of bis(mono- or di-amyl-phenol) sulfide or disulfide. | 1–15% | 5–10%. |
| Drying agent (glycol ethers) | 0–20% | |
| Hydrocarbon petroleum distillate fraction having a boiling point between 300 and 700° F. | Balance | Balance. |

Specific base compositions are illustrated by the following examples:

Composition A

| | Per cent |
|---|---|
| Oil-soluble calcium petroleum sulfonate derived from an oil having mol. wt. 460 | 15 |
| Kerosene | 85 |

Composition B

| | Per cent |
|---|---|
| Oil-soluble calcium petroleum sulfonate having mol. wt. 672 | 25 |
| 40–60 blend of catalytically-cracked light gas oil and straight-run acid-treated gas oil | 75 |

Composition C

| | Per cent |
|---|---|
| Oil-soluble basic calcium petroleum sulfonate having mol. wt. 486–500 | 15–25 |
| 40–60 blend of catalytically-cracked light gas oil and straight-run acid-treated gas oil | 85–75 |

Composition D

| | Per cent |
|---|---|
| Oil-soluble basic calcium petroleum sulfonate having mol. wt. 625 | 15–25 |
| Kerosene | 85–75 |

Composition E

| | Per cent |
|---|---|
| Oil-soluble barium petroleum sulfonate having mol. wt. 460 | 15 |
| Kerosene | 85 |

Composition F

| | Per cent |
|---|---|
| Oil-soluble basic barium petroleum sulfonate derived from an oil having mol. wt. 460 | 15–25 |
| Barium salt of oil-soluble condensation product of p-octylphenol-formaldehyde and having a molecular weight of about 500–1100 | 10 |
| Caustic-treated catalytically-cracked light gas oil | 85–75 |

Composition G

| | Per cent |
|---|---|
| Calcium petroleum sulfonate having mol. wt. 860–920 | 15–25 |
| No. 2 fuel oil comprising mixture of straight-run and cracked gas oil having an end distillation point of from about 580° F. to 610° F. | 85–75 |

Composition H

| | Per cent |
|---|---|
| Oil-soluble calcium petroleum sulfonate having mol. wt. 460 | 22.5 |
| Oil-soluble sodium petroleum sulfonate | 15 |
| No. 3 fuel oil | 62.5 |

Composition I

| | Per cent |
|---|---|
| Oil-soluble calcium petroleum sulfonate having mol. wt. 460–672 | 15 |
| Calcium salt of oil-soluble condensation product of octylphenol-formaldehyde and having a molecular weight of about 500–1100 | 10 |
| 40–60 blend of catalytically-cracked light gas oil and straight-run acid treated gas oil | 75 |

Composition J

| | Per cent |
|---|---|
| Oil-soluble sodium petroleum sulfonate having mol. wt. 460–500 | 15 |
| Calcium salt of oil-soluble condensation product of octylphenol-formaldehyde and having a molecular weight of about 500–1100 | 15 |
| 40–60 blend of catalytically-cracked light gas oil and straight-run acid-treated gas oil | 75 |

Composition K

| | Per cent |
|---|---|
| Oil-soluble calcium petroleum sulfonate having mol. wt. 625 | 15 |
| Calcium salt of oil-soluble condensation product of octylphenol-formaldehyde and having a molecular weight of about 500–1100 | 10 |
| No. 3 fuel oil | 75 |

Composition L

| | Per cent |
|---|---|
| Oil-soluble barium petroleum sulfonate having mol. wt. 460 | 15 |
| Calcium salt of oil-soluble condensation product of octylphenol-formaldehyde and having a molecular weight of about 500–1100 | 10 |
| Kerosene | 75 |

Composition M

| | Per cent |
|---|---|
| Oil-soluble basic calcium petroleum sulfonate having mol. wt. 460 | 15 |
| Barium salt of oil-soluble condensation product of p-octylphenol-formaldehyde and having a molecular weight of about 500–1100 | 10 |
| No. 3 fuel oil | 75 |

Composition N

| | Per cent |
|---|---|
| Calcium petroleum sulfonate having mol. wt. 860–920 | 15 |
| Calcium salt of oil-soluble condensation product of octylphenol-formaldehyde and having a molecular weight of about 500–1100 | 10 |
| No. 2 fuel oil comprising a mixture of straight-run and cracked gas oil having an end distillation point of from about 580° F. to 610° F | 75 |

Composition O

| | Per cent |
|---|---|
| Sodium petroleum sulfonate | 15 |
| Ba salt of alkyl phenol disulfide | 10 |
| 40–60 blend of catalytically-cracked light gas oil and straight-run acid-treated oil | 75 |

Composition P

| | Per cent |
|---|---|
| Sodium petroleum sulfonate derived from a 400 SUS at 100° F. Mid-Continent crude | 15 |
| Barium salt of alkyl phenol disulfide | 10 |
| Kerosene | 75 |

Composition Q

| | Per cent |
|---|---|
| Sodium petroleum sulfonate derived from a 500 SUS at 100° F. Mid-Continent crude | 20 |
| No. 2 fuel oil comprising a mixture of straight-run and cracked gas oil having an end distillation point of from about 580° F. to 610° F | 80 |

Composition R

| | Per cent |
|---|---|
| Dioctyl sodium sulfo succinate | 4.0 |
| Hydrocarbon distillate fuel oil | 96.0 |

Composition S

| | Per cent |
|---|---|
| Dioctyl sodium sulfo succinate | 8.0 |
| Barium salt of alkyl phenol disulfide | 8.0 |
| Hydrocarbon distillate fuel oil | 84.0 |

Composition T

| | Per cent |
|---|---|
| Dioctyl sodium sulfo succinate | 8.0 |
| Barium salt of alkyl phenol disulfide | 8.0 |
| Diethylene glycol monobutyl ether | 50.0 |
| Hydrocarbon distillate fuel oil | 34.0 |

Composition U

| | Per cent |
|---|---|
| Glycerol-phthalic anhydride resin | 20 |
| Barium salt of alkyl phenol sulfide | 10 |
| Fuel oil (blend of straight-run and cracked) | 70 |

Composition V

| | Per cent |
|---|---|
| 1-amino-ethyl-2-heptadecenyl glyoxalidine | 10 |
| No. 3 fuel oil | 90 |

Composition W

| | Per cent |
|---|---|
| Sorbitan monolaurate | 10 |
| No. 3 fuel oil | 90 |

Composition X

| | Per cent |
|---|---|
| Aluminum naphthenate | 15 |
| Sodium petroleum sulfonate | 10 |
| No. 3 fuel oil | 75 |

Concentrate (base) compositions of this invention are generally utilized in proportions of 1 pint or less with from about 250 to about 100 gallons of the fuel oil. Thus, for example, on a percentage basis of fuel used, one pint of any one of the compositions described above per 250 gallons of fuel would correspond to approximately the following concentration of the active ingredients in the final fuel compositions:

Oil-soluble anti-clogging agent(s) such as the polyvalent metal salts of organic sulfonic acid such as derived from a naphthenic petroleum oil, from about 0.0025% to about 0.03%; the auxiliary agents such as the detergents (salt of an alkyl phenol sulfide or salt of alkyl phenol formaldehyde condensation product), from about 0.0015% to 0.005%; drying agent (glycol-ether), from zero to about 0.03%.

The tertiary amine color stabilizers as pointed out, can be added to the concentrate, when anti-clogging agents are used, or to the final blended fuel oil of this invention in amounts sufficient to inhibit discoloration, generally ranging, when calculated in the final composition, of from 0.001% to 1% and preferably from 0.003% to 0.06%.

The following table sets forth actual working examples of final compositions of this invention. The base oil consists of a blend of 20–40% catalytically-cracked gas oil, with 80–60% straight-run gas oil inhibited with additives within the range of proportions already indicated, namely the color stabilizer is present in amounts ranging from 0.001% to 1% based on the final compositions and the anti-clogging concentrate compositions when used are present in proportions of 1 pint or less for from 100 to 250 gallons of the above blended gas oil.

| Components | Composition | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Color Stabilizer: | | | | | | | | | | | | | | | |
| Tri-n-butylamine | x | x | x | x | | | x | x | | | x | | | | x |
| Tri-n-amylamine | | | | x | | | | | | | | | | | x |
| Tri-octyl amine | | | | | x | | | | | | | | x | | |
| Tri-iso-butyl amine | | | | | | | | | x | | | x | | | |
| Di-n-butyl benzylamine | | | | | | x | | | | | | | | x | |
| Diallyl butyl amine | | | | | | | | | | | | | x | | |
| Dibutyl cyclohexyl amine | | | | | | | | | | x | | | | | |
| Anti-clogging Concentrate: | | | | | | | | | | | | | | | |
| Composition A | x | | | | | | | | | | | | | | |
| Composition C | | x | | | | | | | | | | | | | |
| Composition H | | | x | | | | | | | | | | | | |
| Composition J | | | | x | | | | | | | | | | | |
| Composition E | | | | | x | | | | | | | | | | |
| Composition M | | | | | | x | | | | | | | | | |
| Composition O | | | | | | | x | | | | | | | | |
| Composition Q | | | | | | | | x | x | | | | | | |
| Composition S | | | | | | | | | | x | | | | | |

In order to demonstrate the criticalness in proportion of the blends used to form compositions of this invention, which can contain the anti-clogging bases as described, and the effectiveness of the tertiary amines as color stabilizers, the compositions identified herein below were subjected to an accelerated deterioration test which is essentially as follows:

About 100 ml. of the composition to be tested is fogged with about 0.5 gm. of steam into which is then placed a clean 8 mm. diameter coil of No. 14 A. W. G. copper wire, and the composition is aged at an elevated temperature (around the boiling point of water) and under $O_2$ pressure until discoloration has been observed.

The compositions tested were as follows and the results are tabulated below:

I. Untreated catalytically-cracked gas oil
II. Caustic-treated catalytically-cracked gas oil
III. Straight-run gas oil
IV. 25% untreated catalytically-cracked gas oil + 75% straight-run gas oil
V. 37% untreated catalytically-cracked gas oil + 63% straight-run gas oil
VI. 25% caustic-treated catalytically-cracked gas oil + 75% straight-run gas oil
VII. 25% acid treated catalytically-cracked gas oil + 75% straight-run gas oil
VIII. 50% untreated catalytically-cracked gas oil + 50% straight-run gas oil
IX. Fuel oil (I) containing the additives of Composition 1.
X. Fuel oil (III) containing the additives of Composition 3.
XI. Fuel oil (VIII) containing the additives of Composition 7.
XII. Fuel oil (VIII) containing the additives of Composition 11.
XIII. Fuel oil (II) containing the additives of Composition 4.
XIV. Fuel oil (VI) containing the additives of Composition 1.
XV. Fuel oil (VI) containing the additives of Composition 3.
XVI. Fuel oil (VI) containing the additives of Composition 4.
XVII. Fuel oil (VI) containing the additives of Composition 7.
XVIII. Fuel oil (V) containing the additives of Composition 7.
XIX. Fuel oil (IV) containing the additives of Compositon 7.
XX. Fuel oil (VI) containing the additives of Composition 11.
XXI. Fuel oil (I) containing 0.05% diethanolamine.
XXII. Fuel oil (III) containing 0.05% diethanolamine.
XXIII. Fuel oil (VIII) containing 0.05% diethanolamine.
XXIV. Fuel oil (VI) containing 0.05% diethanolamine.
XXV. Fuel oil (I) containing 0.05% aniline.
XXVI. Fuel oil (III) containing 0.05% aniline.
XXVII. Fuel oil (VIII) containing 0.05% aniline.
XXVIII. Fuel oil (VI) containing 0.05% aniline.
XXIX. Fuel oil (I) containing 0.05% 2,4 ditertbutyl 6-methyl phenol.
XXX. Fuel oil (III) containing 0.05% 2,4 ditertbutyl 6-methyl phenol.
XXXI. Fuel oil (VIII) containing 0.05% 2,4 ditertbutyl 6-methyl phenol.
XXXII. Fuel oil (VI) containing 0.05% 2,4 ditertbutyl 6-methyl phenol.
XXXIII. Fuel oil (I) containing 0.05% diethanolamine + anti-clogging concentrate O.
XXXIV. Fuel oil (III) containing 0.05% diethanolamine + anti-clogging concentrate O.
XXXV. Fuel oil (VIII) containing 0.05% diethanolamine + anti-clogging concentrate O.
XXXVI. Fuel oil (VI) containing 0.05% diethanolamine + anti-clogging concentrate O.
XXXVII. Fuel oil (I) containing 0.05% aniline + anti-clogging concentrate O.
XXXVIII. Fuel oil (III) containing 0.05% aniline + anti-clogging concentrate O.
XXXIX. Fuel oil (VIII) containing 0.05% aniline + anti-clogging concentrate O.
XL. Fuel oil (VI) containing 0.05% aniline + anti-clogging concentrate O.
XLI. Fuel oil (I) containing 0.05% 2,4 ditertbutyl 6-methyl phenol + anti-clogging concentrate O.
XLII. Fuel oil (III) containing 0.06% 2,4 ditertbutyl 6-methyl phenol + anti-clogging concentrate O.
XLIII. Fuel oil (VIII) containing 0.05% 2,4 ditertbutyl 6-methyl phenol + anti-clogging concentrate O.
XLIV. Fuel oil (VI) containing 0.05% 2,4 ditertbutyl 6-methyl phenol + anti-clogging concentrate O.

TEST RESULTS

| Composition | Test (hrs.) | Appearance Rating [1] |
|---|---|---|
| I | 2 | B |
| II | 2 | B |
| III | 2 | B |
| IV | 2 | C |
| V | 2 | C |
| VI | 2 | C |
| VII | 2 | C |
| VIII | 2 | C– |
| IX | 2 | C |
| X | 2 | B |
| XI | 2 | C |
| XII | 2 | C |
| XIII | 2 | B |
| XIV | 88 | A |
| XV | 88 | A |
| XVI | 88 | A |
| XVII | 88 | A |
| XVIII | 88 | A |
| XIX | 88 | A |
| XX | 88 | A |
| XXI | 2-4 | C |
| XXII | 2-4 | C |
| XXIII | 2-4 | C |
| XXIV | 2-4 | C |
| XXV | 2-4 | C |
| XXVI | 2-4 | C |
| XXVII | 2-4 | C |
| XXVIII | 2-4 | C |
| XXIX | 2-4 | C |
| XXX | 2-4 | C |
| XXXI | 2-4 | C |
| XXXII | 2-4 | C |
| XXXIII | 2-4 | C |
| XXXIV | 2-4 | C |
| XXXV | 2-4 | C |
| XXXVI | 2-4 | C |
| XXXVII | 2-4 | C |
| XXXVIII | 2-4 | C |
| XXXIX | 2-4 | C |
| XL | 2-4 | C |
| XLI | 2-4 | C |
| XLII | 2-4 | C |
| XLIII | 2-4 | C |
| XLIV | 2-4 | C |

[1] Straw to light amber—excellent (A).
Dark amber-green—poor (B).
Green to very dark green—very poor (C).
Rating A indicates passing results, while rating B or C indicates failure.

To compositions of this invention may be added minor amounts of foam inhibitors, such as a silicone liquid, e. g. dimethyl silicone, fluoro organic compounds, fluoro paraffins, salts of organic and inorganic acids such as soaps, phosphates, and the like. Compositions of this invention are non-corrosive as well as inhibit corrosion and do not interfere with the function of the fluid in which they are dispersed.

The invention claimed is:

1. A color stable, non-clogging blended fuel oil consisting of from 10% to 40% of cracked fuel oil and from 90% to 60% of straight-run fuel oil having incorporated therein from 0.001% to 1% of tri-n-butyl-amine and from 0.0025% to 0.05% of sodium petroleum sulfonate, and from 0.0015% to 0.004% of calcium salt of octyl phenol-formaldehyde condensation product.

2. A color stable, non-clogging blended fuel oil consisting of from 10% to 40% of cracked fuel oil and from 90% to 60% of straight-run fuel oil having incorporated therein from 0.001% to 1% of tri-n-butyl-amine and from 0.0025% to 0.05% of sodium petroleum sulfonate, and from 0.0015% to 0.004% of barium salt of dialkyl phenol sulfide.

3. A color stable, non-clogging blended fuel oil consisting of from 10% to 40% of cracked fuel oil and from 90% to 60% of straight-run fuel oil, having incorporated therein from 0.001% to 1% of tri-n-butyl-amine and from 0.0025% to 0.05% of calcium petroleum sulfonate.

4. A color stable, non-clogging blended fuel oil consisting of from 10% to 40% of cracked fuel oil and from 90% to 60% of straight-run fuel oil having incorporated therein from 0.001% to 1% of tri-n-butyl-amine and from 0.0025% to 0.05% of sodium petroleum sulfonate.

5. A blended fuel oil consisting of from 10% to 40% of cracked fuel oil and from 90% to 60% of a straight-run fuel oil, stabilized against color deterioration by incorporating therein from 0.001% to 1% of an oil-soluble tertiary straight chain alkyl amine, each of said alkyl radicals having at least four carbon atoms, and from 0.0025% to 0.05% sufficient to prevent clogging, of a petroleum sulfonate, and from 0.0015% to 0.004% of a metal phenate.

6. A blended fuel oil consisting of from 10% to 40% of cracked fuel oil and from 90% to 60% of straight-run fuel oil, stabilized against color deterioration by incorporating therein from 0.001% to 1% of an oil-soluble tertiary straight chain alkyl amine, each of said alkyl radicals having at least four carbon atoms, and from 0.0025% to 0.05% sufficient to prevent clogging of an organic sulfonate, and from 0.0015% to 0.004% of a metal salt of an aromatic acidic compound.

7. A blended fuel oil consisting of from 10% to 40% of cracked fuel oil and from 90% to 60% of straight-run fuel oil, stabilized against color deterioration by incorporating therein from 0.001% to 1% of an oil-soluble tertiary straight chain alkyl amine, each of said alkyl radicals having at least four carbon atoms, and from 0.0025% to 0.05% sufficient to prevent clogging, of a petroleum sulfonate.

8. A blended fuel oil consisting of from 10% to 40% of cracked fuel oil and from 90% to 60% of straight-run fuel oil, stabilized against color deterioration by incorporating therein from 0.001% to 1% of an oil-soluble tertiary straight chain alkyl amine, each of said alkyl radicals having at least four carbon atoms, and from 0.0025% to 0.05%, sufficient to prevent clogging, of an organic sulfonate.

9. A blended fuel oil consisting of at least 60% straight-run fuel oil, the balance of the fuel oil blend being a cracked fuel oil, stabilized against color deterioration by incorporating therein from 0.001% to 1% of an oil-soluble tertiary alkyl amine, each of said alkyl radicals having at least four carbon atoms and from 0.0025% to 0.05% of an anti-clogging fuel oil agent.

10. A blended fuel oil consisting of from 10% to 40% of cracked fuel oil and from 90% to 60% of straight-run fuel oil, stabilized against color deterioration by incorporating therein from 0.001% to 1% of an oil-soluble di-n-butyl benzylamine.

11. A blended fuel oil consisting of from 10% to 40% of cracked fuel oil and from 90% to 60% of straight-run fuel oil, stabilized against color deterioration by incorporating therein from 0.001% to 1% of an oil-soluble tri-n-octylamine.

12. A blended fuel oil consisting of from 10% to 40% cracked fuel oil and from 90% to 60% of straight-run fuel oil, stabilized against color deterioration by incorporating therein from 0.001% to 1% of an oil-soluble tri-n-butylamine.

13. A blended fuel oil consisting of from 10% to 80% of cracked fuel oil and from 90% to 20% of straight-run fuel oil, stabilized against color deterioration by incorporating therein from 0.001% to 1% of an oil-soluble tertiary, straight chain alkyl amine, each of said alkyl radicals having at least four carbon atoms.

14. A blended fuel oil consisting of at least 60% straight-run fuel oil the balance of the fuel oil blend being a cracked fuel oil, stabilized against color deterioration by incorporating therein from 0.001% to 1% of an oil-soluble tertiary straight chain alkyl amine each of said alkyl radicals having at least four carbon atoms.

15. A blended fuel oil consisting of at least 60% straight-run fuel oil the balance of the fuel oil blend being a cracked fuel oil, stabilized against color deterioration by incorporating therein from 0.001% to 1% of an oil-soluble tertiary alkyl amine each of said alkyl radicals having at least four carbon atoms.

16. A blended fuel oil consisting of at least 20% straight-run fuel oil, the balance of the fuel oil blend being a cracked fuel oil, stabilized against color deterioration by incorporating therein from 0.001% to 1% of an oil-soluble tertiary amine having at least one non-aromatic hydrocarbon radical in the molecule.

17. A blended fuel oil consisting of at least 20% straight-run fuel oil the balance of the fuel oil blend being a cracked fuel oil, stabilized against color deterioration by incorporating therein from 0.001% to 1% of an oil-soluble tertiary amine having at least one non-aromatic hydrocarbon radical in the molecule and from 0.0025% to 0.05% of an anti-clogging fuel oil agent.

18. A fuel oil composition comprising at least 20% straight run fuel oil and the balance of the fuel oil being a cracked fuel oil, stabilized against color deterioration by incorporation therein from 0.001% to 1% of an oil-soluble tertiary amine having at least one non-aromatic hydrocarbon radical in the molecule, said color stabilized fuel oil being rendered non-clogging by addition thereto of about one pint per 100–250 gallons of the fuel oil, of a concentrate comprising from 2% to 30% of an organic sulfonate, from 1% to 15% of metal salt of an aromatic acidic compound; and the balance a petroleum fraction boiling between 300° F. and 700° F.

19. A fuel oil composition comprising at least 20% straight run fuel oil and the balance of the fuel oil being a cracked fuel oil, stabilized against color deterioration by incorporating therein from 0.001% to 1% of an oil-soluble tertiary amine having at least one non-aromatic hydrocarbon radical in the molecule, said color stabilized fuel oil being rendered non-clogging by addition thereto of about one pint per 100–250 gallons of the fuel oil, of a concentrate comprising from 2% to 30% of a metal petroleum sulfonate, from 1% to 15% of metal phenate, and the balance a petroleum fraction boiling between 300° F. and 700° F.

20. A fuel oil composition comprising at least 20% straight run fuel oil and the balance of the fuel oil being a cracked fuel oil, stabilized against color deterioration by incorporating therein from 0.001% to 1% of an oil-soluble tertiary amine having at least one non-aromatic hydrocarbon radical in the molecule, said color stabilized fuel oil being rendered non-clogging by addition thereto of about one pint per 100–250 gallons of the fuel oil, of a concentrate comprising from 2% to 30% of a sodium petroleum sulfonate, from 1% to 15% of calcium salt of octyl phenol-formaldehyde condensation product, and the balance a petroleum fraction boiling between 300° F. and 700° F.

WILLIAM A. BONNER.

References Cited in the file of this patent

UNITED STATES PATENTS

| Number | Name | Date |
|---|---|---|
| 1,888,023 | Adams | Nov. 15, 1932 |
| 1,992,014 | Rogers | Feb. 19, 1935 |
| 2,369,490 | Proell | Feb. 13, 1945 |
| 2,575,003 | Caron | Nov. 13, 1951 |

OTHER REFERENCES

Color Stabilization of Gasoline by Amines, pub. in Ind. and Eng. Chem., February 1935, pp. 156–160.